(12) United States Patent
Banhegyi et al.

(10) Patent No.: US 8,540,064 B2
(45) Date of Patent: Sep. 24, 2013

(54) DRIVE FOR AN HYBRID VEHICLE AND CLUTCH HAVING A RELEASE MECHANISM

(75) Inventors: Erich Banhegyi, Tamm (DE); Andreas Herzberger, Welzheim (DE)

(73) Assignee: Robert Bosch GmbH, Stuttgart (DE)

( * ) Notice: Subject to any disclaimer, the term of this patent is extended or adjusted under 35 U.S.C. 154(b) by 317 days.

(21) Appl. No.: 12/736,031

(22) PCT Filed: Jan. 21, 2009

(86) PCT No.: PCT/EP2009/050649
§ 371 (c)(1),
(2), (4) Date: Sep. 1, 2010

(87) PCT Pub. No.: WO2009/109412
PCT Pub. Date: Sep. 11, 2009

(65) Prior Publication Data
US 2010/0320015 A1    Dec. 23, 2010

(30) Foreign Application Priority Data

Mar. 6, 2008  (DE) .......................... 10 2008 012 903

(51) Int. Cl.
*F16D 23/14*  (2006.01)
*B60K 6/387*  (2007.10)
(52) U.S. Cl.
USPC ................... 192/30 V; 192/85.57; 192/85.59

(58) Field of Classification Search
USPC ................... 192/85.51, 115; 92/143
See application file for complete search history.

(56) References Cited

U.S. PATENT DOCUMENTS

| 3,835,963 | A | * | 9/1974 | Ohtani | 192/30 V |
| 4,585,106 | A | * | 4/1986 | Shirley | 192/85.51 |
| 5,086,899 | A | * | 2/1992 | Latsko | 192/30 V |
| 5,691,588 | A |   | 11/1997 | Lutz et al. | |
| 6,561,336 | B1 | * | 5/2003 | Huart et al. | 192/85.49 |
| 6,719,115 | B2 | * | 4/2004 | Rogner et al. | 192/98 |

FOREIGN PATENT DOCUMENTS

| DE | 36 12 419 | 10/1987 |
| DE | 41 03 931 | 8/1992 |
| DE | 196 22 707 | 12/1996 |
| DE | 199 54 372 | 6/2001 |
| DE | 102 04 156 | 8/2003 |
| DE | 10313435 | 10/2003 |
| DE | 10 2006 016 133 | 10/2007 |
| EP | 0 242 6571 | 10/1987 |
| EP | 1643146 | 4/2006 |
| EP | 1 843 146 | 10/2007 |
| FR | 2 837 246 | 9/2003 |
| GB | 2 052 670 | 1/1981 |

* cited by examiner

*Primary Examiner* — Rodney Bonck
(74) *Attorney, Agent, or Firm* — Kenyon & Kenyon LLP

(57) ABSTRACT

A drive for an hybrid vehicle, having an electric machine situated in a housing and having a clutch that is provided with a release mechanism. The release mechanism is connected to a housing-mounted component, that is locked against rotation, via at least one damping element, the damping element absorbing multi-dimensional motions.

9 Claims, 3 Drawing Sheets

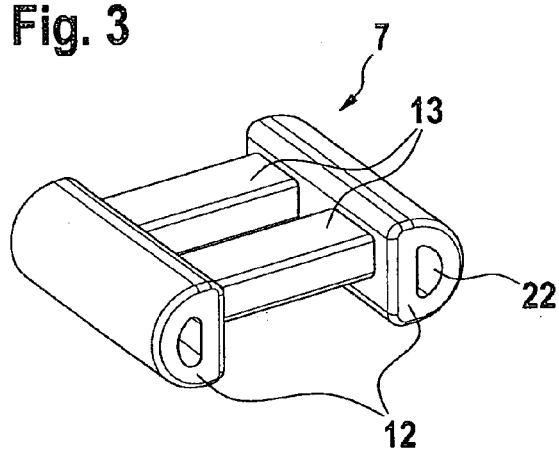
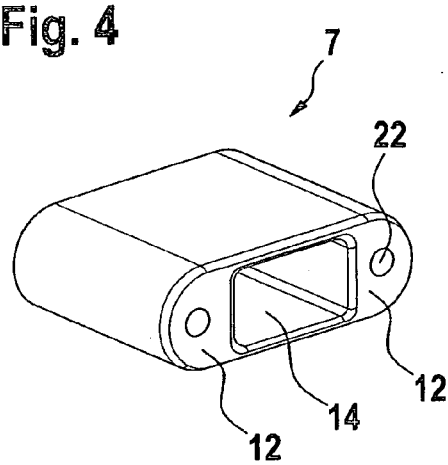
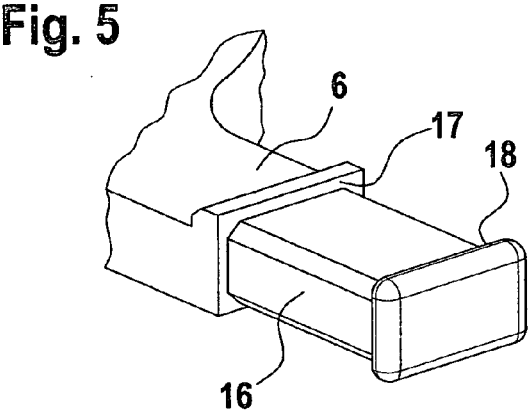
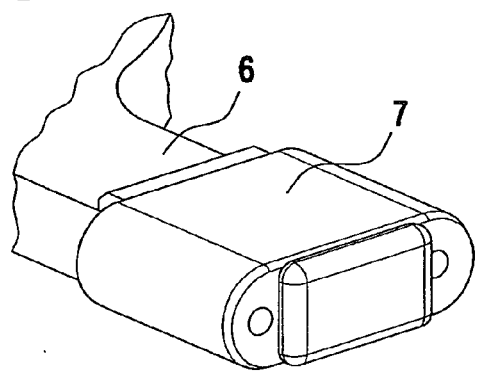

DRIVE FOR AN HYBRID VEHICLE AND CLUTCH HAVING A RELEASE MECHANISM

FIELD OF THE INVENTION

The present invention relates to a drive for an hybrid vehicle as well as a clutch having a release mechanism.

BACKGROUND INFORMATION

German Laid-Open Patent Document DE 10 2006 016 133 A1 discusses that drives for hybrid vehicles are generally made up of an internal combustion engine, at least one clutch and an electric machine. A clutch is connected between the internal combustion engine and the electric machine, which is opened or closed depending on the operating strategy and the respective operating state. Clutches in vehicles driven by hybrid drives have to be more capable of taking loads than usual motor vehicle clutches, because of the increased number of operations that are created by the operating strategies in the hybrid vehicle. One possibility of increasing the service life provides that the release mechanism of the clutch in the clutch system be rotatably mounted, and supported on a housing part that is locked against rotation, which is spoken of as a cover-fastened release mechanism, as is discussed, for example, in German Laid-Open Patent Document DE 103 13 435 A1.

It is a disadvantage in such an embodiment of hybrid systems that drag torques are created by the bearings that are additionally required in the release mechanism and in the clutch system, by contrast to the usual release mechanisms that are fixed to the housing. At the contact location between the release mechanism and the housing, in the long run, these drag torques lead to wear and to damage that may impair the functioning of the drive system, and may finally lead to malfunction.

SUMMARY OF THE INVENTION

In order to remove these disadvantages, the exemplary embodiments and/or exemplary methods of the present invention provides a drive for an hybrid vehicle, whose electric machine is situated in a housing, and whose clutch is provided with a release mechanism that is supported in the clutch and, via at least one damping element, is connected in a torsion-proof manner to a component that is fixed to the housing One advantage of a release mechanism that is fixed to the cover of a clutch in a drive of a vehicle, that is driven hybridly, is that forces that are created during the operation of the clutch, and their counterforce (action=reaction) are absorbed by the cover of the clutch's pressure plate and consequently remain in the clutch system. In the usual release mechanisms that are fixed to the housing, the forces created in response to operation are absorbed via the housing of the clutch, and the counterforces created thereby are passed on via the clutch and the crankshaft, and absorbed by the crankshaft bearings. Crankshaft bearings are usually designed as radial friction bearings, and are thus not designed for hybrid-specific requirements.

The cap bearing accommodated in the clutch pressure plate and the release bearing accommodated in the release mechanism are the cause of drag torques in response to a rotating motion of the clutch pressure plate. These torques and the tangential motions in the main load direction are advantageously absorbed via a lever of the release mechanism which is supported on a component that is fixed to the housing.

Various form-locking connections are conceivable between the release mechanism and the component that is fixed to the housing, such as projections on the release mechanism and a corresponding negative geometry on the component that is fixed to the housing, for the purpose of absorbing motions and drag torques.

An end shield of an electric machine, that is situated directly at the clutch, is advantageously provided as the component that is fixed to the housing, for making the clutch disengaging gear torsion-proof. The utilization of component parts present in the drive system of the hybrid vehicle saves installation space and the costs of additional components.

Because of the highly dynamic behavior of the clutch, which comes about due to crankshaft motions, manufacturing-related axial eccentricities and residual imbalances, there are also created, in addition to the tangential motions, multi-dimensional relative motions between the disengaging gear fixed to the clutch pressure plate and the component that is fixed to the housing. In this context, acceleration forces occur which amount to a multiple of the forces that are absorbed statically. The relative motions cause wear between the lever and the component that is fixed to the housing, as well as high noise emission. According to the exemplary embodiments and/or exemplary methods of the present invention, these relative motions are absorbed by a damping element, in a manner that is free from wear and low in noise.

The damping element may be made of an elastomer, in particular of an elastomer of Shore hardness A 60.

According to the exemplary embodiments and/or exemplary methods of the present invention, the damping element is designed so that it is adjacent to the component that is fixed to the housing, and absorbs the motions created. The freedom from wear is given by a high coefficient of friction between the damping element and the component that is fixed to the housing, since the high coefficient of friction does not permit any relative motion between the damping element and the component that is fixed to the housing.

One exemplary embodiment provides that stops be developed on the end shield, between which the lever of the release mechanism engages. Depending on the type of production of the end shield, these may be cast on, screwed on or connected to the end shield in another manner.

In one advantageous specific embodiment, the damping element has a damping bead at the active areas with the stops, respectively, so as to obtain a better damping response by using more material. The damping element may be configured in such a way that, between the stops of the end shield and the damping element, there is a press fit, and thus a prestressing.

In one embodiment, the damping beads are connected to one another by crosspieces which make possible screwing together or pinning together the damping element with the lever of the release mechanism. The lever has suitable bores for this assembly.

An additional specific embodiment that is cost-effective and assembly-friendly provides that the damping element be developed as a tube having laterally attached damping. This specific embodiment is assembled by being turned upside down lightly onto the lever of the release mechanism. The geometry of the lever is developed by an encircling groove and by limiting steps in such a way that the damping element fits in optimally, and is radially fixed.

Exemplary embodiments of the present invention are depicted in the drawings and described in greater detail in the description below.

BRIEF DESCRIPTION OF THE DRAWINGS

FIG. 3 shows a perspective representation of a first specific embodiment of a damping element.

FIG. 4 shows a perspective representation of a second specific embodiment of a damping element.

FIG. 5 shows a perspective representation of a specific embodiment of a projection.

FIG. 6 shows a perspective representation of a mounted damping element according to the second specific embodiment.

DETAILED DESCRIPTION

Figure 1:
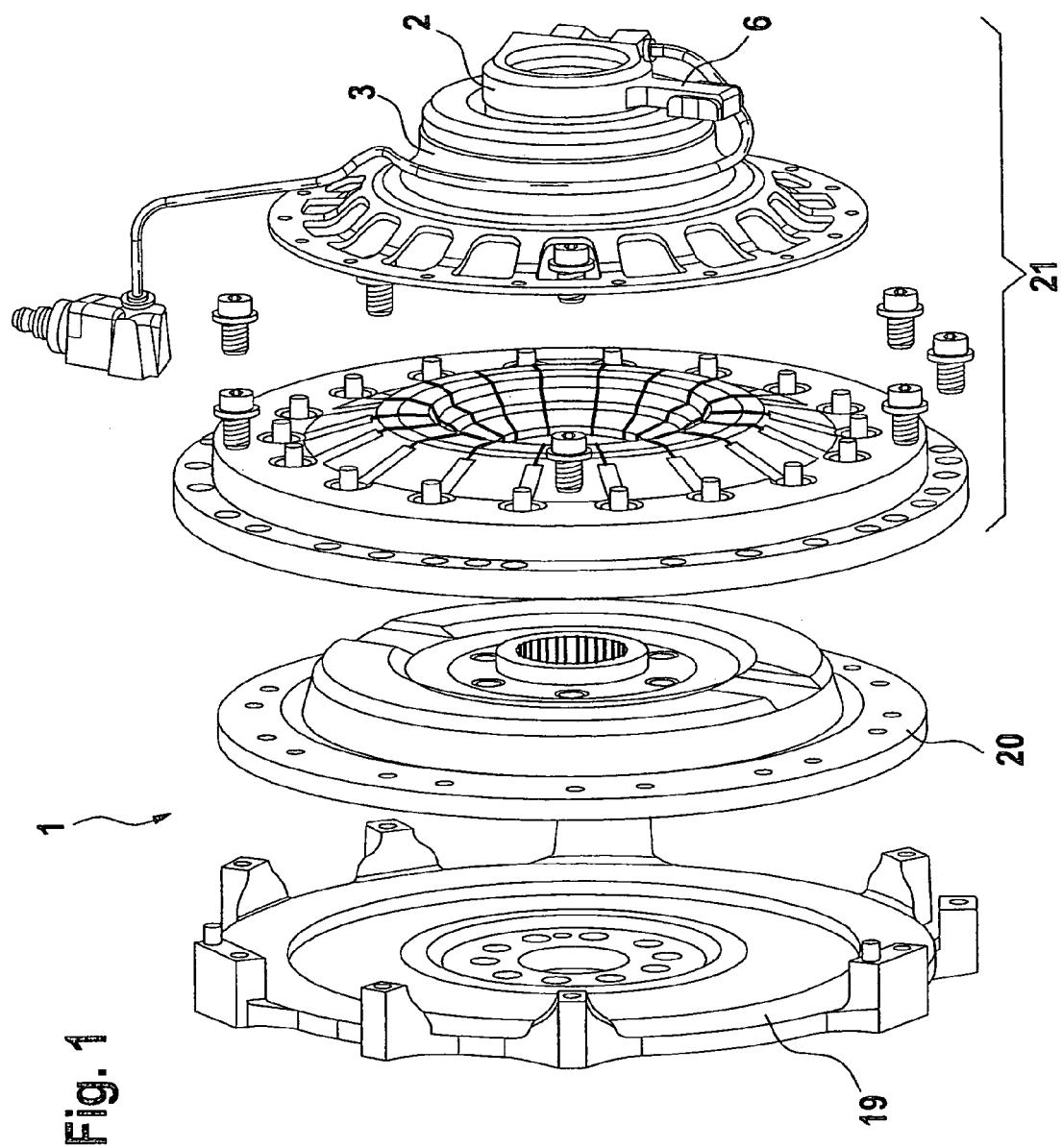
FIG. 1 shows an exploded drawing of a perspective representation of a clutch.

The exploded drawing represented in FIG. 1 shows the essential components of a coupling 1.

A release mechanism 2 having a projection 6 is shown, which is supported in a cover 3 of a pressure plate 21. Furthermore, the system of clutch 1 includes a flywheel 19 and a clutch disk 20.

Figure 2:
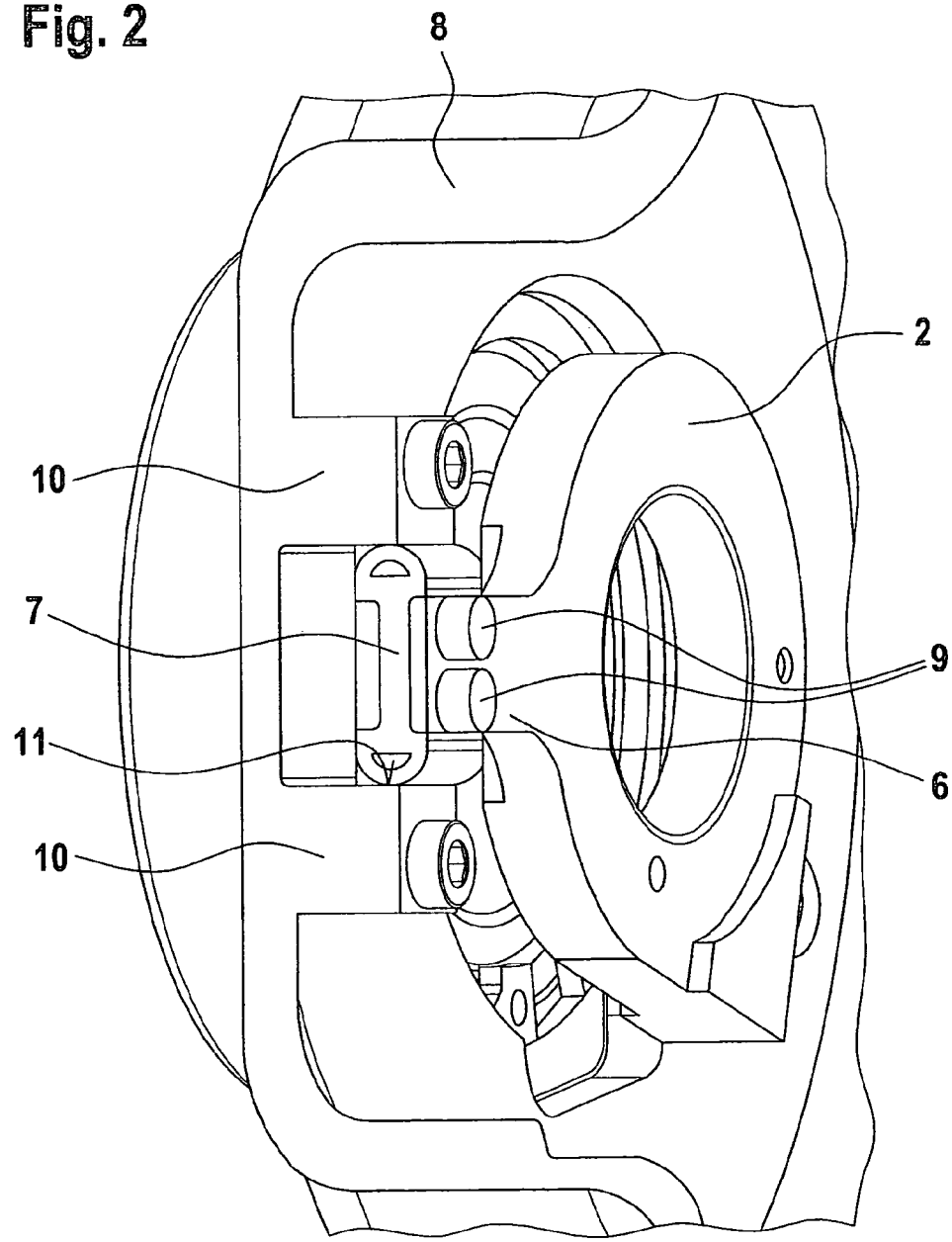
FIG. 2 shows a perspective representation of a cutout of an end shield and of a release mechanism.

FIG. 2 shows the release mechanism 2 in greater detail. Projection 6 is formed by a lever that is radially projecting away from release mechanism 2, to which a damping element 7 is fixed using connecting elements 9. These may be screws or pins, for example. In the specific embodiment shown in FIG. 2, a component 8, that is fastened to the housing, is formed by an end shield of an electric machine, to which two stops 10, that are at a distance from each other, are attached as one piece, between which damping element 7, that is mounted on projection 6, engages. Damping element 7 touches stops 10 via friction surfaces 11, stops 10 preventing the twisting of release mechanism 2 in the tangential direction, as well as absorbing forces and torques of release mechanism 2. The absorption of the forces and torques, as well as the securing from twisting in the tangential direction may also be performed by any geometrical shape which forms a form-locking connection between projection 6 and component 8, fastened to the housing, via damping element 7.

Housing-fastened component 8 may be made of metal, for instance, and produced by a casting method that makes possible the in-one-piece attachment of stops 10. Stops 10 may alternatively also be connected by screws or rivets to housing-fastened component 8.

A first specific embodiment of damping element 7 is shown in FIG. 3. Damping element 7 is formed in one piece of two damping beads 12, directed parallel to each other, which are connected to each other by two crosspieces 13. In this specific embodiment, damping beads 12 are semicircular in cross section, the rounded side being directed outwards in each case. Crosspieces 13 are attached at the flat inner side. Each of damping beads 12 has a hollow space, which is developed as a passage 22, parallel to projection 6 of release mechanism 2 in the radial direction, and which is used for the improvement of the damping response. In one exemplary embodiment, passage 22 is developed in the same geometric shape as damping beads 12. Other geometric shapes are also possible for passages 22 which improve the damping response, and so are damping beads 12 made of solid material.

Crosspieces 13 are developed to be rectangular and have a lower mass than damping beads 12 in the axial direction of release mechanism 2. Crosspieces 13, in the axial direction of release mechanism 2, are attached to the flat inner side of damping beads 12 in such a way that they do not terminate at the upper and lower edges of damping beads 12. A minimum distance is to be kept between crosspieces 13, which enables putting through connecting elements 9. The design of this embodiment is used for accommodating damping element 7 in projection 6 of release mechanism 2, damping element 7 being pushed into the projection and being fixed to release mechanism 2 using screws or pins, for example.

One further specific embodiment is depicted in FIGS. 4 to 6. Damping element 7 is developed as a tube 14, and has damping beads 12 at the sides, which are rounded off towards the outside. In damping beads 12 passages 22 are formed having a circular cross section, and being provided with an unmolding angle for its production. In this specific embodiment too, additional geometric cross sections are possible that are conducive to the functioning, as well as damping beads 12 made of solid material. Inner tube 14 of damping element 7 in FIG. 4 has the same geometric shape as a groove 16 of projection 6 of release mechanism 2, shown in FIG. 5. In this embodiment, what is advantageous is the simple assembly of damping element 7 by turning it upside down over projection 6, which is sufficient without using additional connecting elements. In the specific embodiment shown in FIG. 5, on projection 6, limiting steps 17, 18 are attached as one piece, which fix damping element 7 on release mechanism 2, in the radial direction of release mechanism 2. The inner cross section of tube 14 should be configured to be smaller than the outer cross section of groove 16, for the improved retention on projection 6. This ensures a close fit of damping element 7 on projection 6, and improves the absorption of the forces and torques that occur.

The material of damping element 7 has damping properties and has a high coefficient of friction on friction surface 11 between damping element 7 and stops 10. These properties may be fulfilled by elastomers, especially by elastomers having a Shore hardness of A 60. Damping elements 7 are produced, for instance, by injection molding, extruding or transfer molding.

What is claimed is:

1. A drive for a hybrid vehicle, comprising:
a housing having:
an electric machine that is situated in the housing and having a clutch, which includes a release mechanism that is supported on the clutch;
wherein the release mechanism is connected to a housing-mounted component formed as an end shield of the electric machine, the component being locked against rotation, via at least one damping element;
wherein the release mechanism is connected to the housing-mounted component in a form-locking manner via at least one projection; and
wherein stops are screwed on the housing-mounted component, between which the projection engages.

2. The drive for a hybrid vehicle of claim 1, wherein the damping element lies against the housing-mounted component, so as to form a friction pairing having a high coefficient of friction such that relative motion between the damping element and the housing-mounted component is not permitted.

3. The drive for a hybrid vehicle of claim 2, wherein the damping element is formed of an elastomer having a Shore hardness of A 60.

4. A drive for a hybrid vehicle, comprising:
a housing having:
an electric machine that is situated in the housing and having a clutch, which includes a release mechanism that is supported on the clutch;
wherein the release mechanism is connected to a housing-mounted component, which is locked against rotation, via at least one damping element;

wherein the release mechanism is connected to the housing-mounted component in a form-locking manner via at least one projection;

wherein stops are screwed on the housing-mounted component, between which the projection engages;

wherein the damping element is made up of two damping beads that collaborate with the stops.

5. The drive for a hybrid vehicle of claim 4, wherein the damping beads of the damping element are connected to each other in one piece via at least one crosspiece.

6. The drive for a hybrid vehicle of claim 5, wherein the projection of the release mechanism has at least one passage bore, via which the damping element is fastened to the release mechanism using connecting elements, which are one of screws and pins.

7. The drive for a hybrid vehicle of claim 4, wherein the damping element is a tube at whose sides the damping beads are attached.

8. The drive for a hybrid vehicle of claim 7, wherein the projection of the release mechanism has an encircling groove into which the damping element is fitted in, and wherein limiting steps are attached at end faces of the groove.

9. A clutch for use in a drive for a hybrid vehicle, comprising:

a clutch arrangement, which includes a release mechanism that is supported on the clutch arrangement;

wherein the release mechanism is connected to a housing-mounted component formed as an end shield of an electric machine, the component being locked against rotation, via at least one damping element;

wherein the release mechanism is connected to the housing-mounted component in a form-locking manner via at least one projection; and wherein stops are screwed on the housing-mounted component, between which the projection engages.

* * * * *

UNITED STATES PATENT AND TRADEMARK OFFICE
CERTIFICATE OF CORRECTION

PATENT NO. : 8,540,064 B2  Page 1 of 1
APPLICATION NO. : 12/736031
DATED : September 24, 2013
INVENTOR(S) : Banhegyi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 318 days.

Signed and Sealed this
Fifteenth Day of September, 2015

Michelle K. Lee
*Director of the United States Patent and Trademark Office*